Dec. 8, 1959  J. G. LINDEMAN ET AL  2,916,300
ADJUSTABLE DRAWBAR
Filed June 11, 1956  2 Sheets-Sheet 2
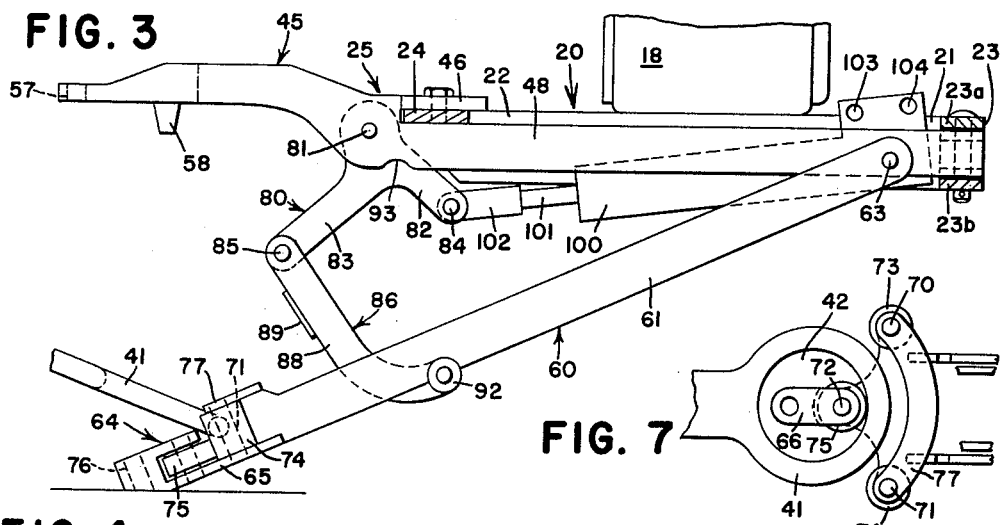
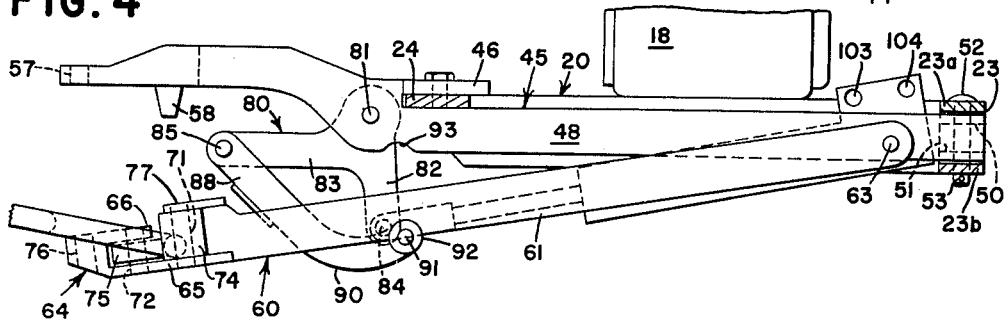
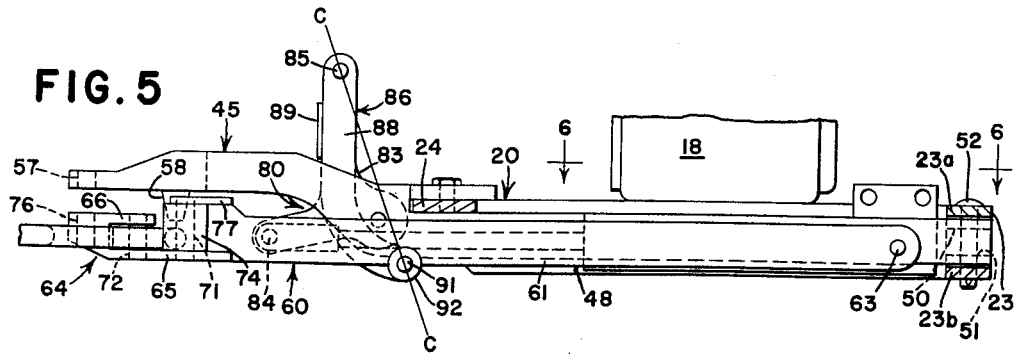
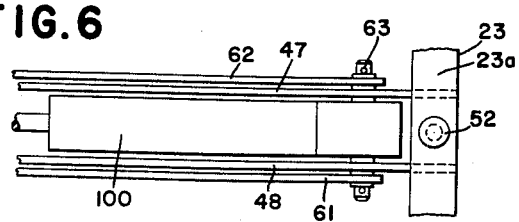
*INVENTORS*
J. G. LINDEMAN
O. L. DURLAND
BY
C. Parker & W.A. Murray
ATTORNEYS

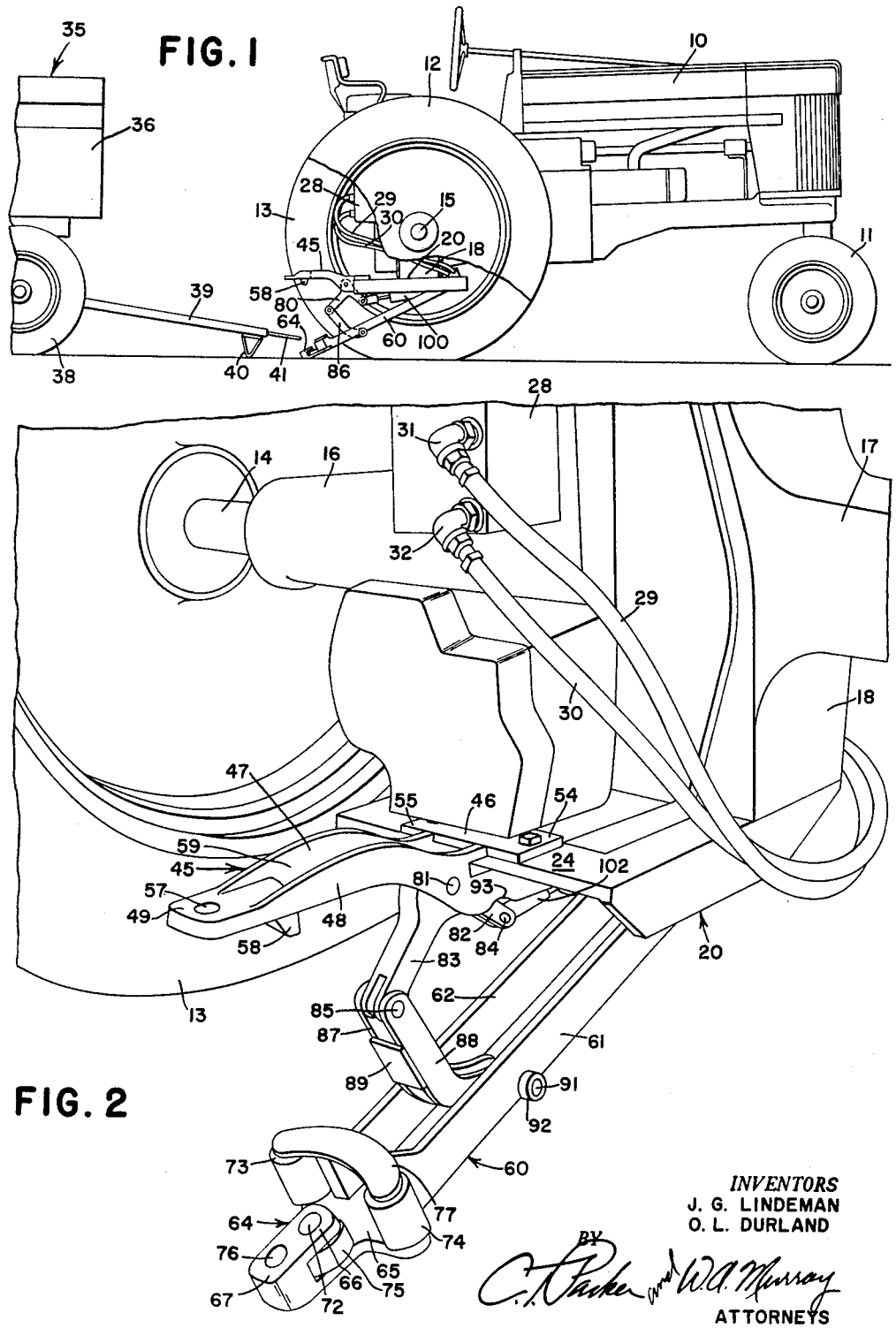

United States Patent Office 2,916,300
Patented Dec. 8, 1959

2,916,300

ADJUSTABLE DRAWBAR

Jesse G. Lindeman and Orie L. Durland, Yakima, Wash., assignors, by mesne assignments, to Deere & Company, a corporation of Delaware Application June 11, 1956, Serial No. 590,585

6 Claims. (Cl. 280—479)

This invention relates to a draft device and more particularly to a type of draft device which may be adjusted vertically to permit it to be coupled to implements of the type having their forward ends resting on or proximate to the ground level. Still more particularly this invention relates to an attachment which may be mounted on conventional type tractors and which serves the above described purpose.

In many of the present day trail-behind type of implements, the weight of the implement is so distributed to be overbalanced at its forward end, and unless otherwise restricted, the end will rest on the ground. Therefore, in connecting a tractor to this type of implement, it is normally necessary to dismount from the tractor and to lift the forward end of the implement to the height of the tractor drawbar where a suitable coupling is provided. This creates not only a time consuming task, but also creates a certain degree of hazard due in the first instance to the mounting and dismounting from the tractor seat by the operator, and in the second instance due to the manual method of raising the forward end of the implement to the height of the tractor drawbar. Particularly in recent years, this latter hazard has become more potentially dangerous inasmuch as the tendency has been to enlarge and increase the weight of the trailing implements and the loads which they carry. In many instances, such as would occur in a loaded two-wheeled type of manure spreader, the weight problem has increased to such an extent that mechanical or other type of power means is required to lift the forward end of the implement.

It is therefore the primary object of this invention to provide a new and novel type of coupling mechanism which may be connected to the tractor and which provides for a vertically swinging drawbar which may be maneuvered to a position under a hitch ring on a trailing implement, and which when upon engaging the ring may then be raised by power means on the tractor, thereby raising the forward end of the implement in preparation of its being pulled or drawn by the tractor.

It is also an object of the invention to provide means on the coupling mechanism which will prevent the ring on the trailing implement from becoming disengaged from the drawbar while the tractor is pulling the vehicle.

It is still a further object of the present invention to incorporate in the drawbar mechanism means for automatically locking the drawbar in its raised position which is independent of the power lift system. Therefore, even should the power system which is used to raise the drawbar fail, the hitch will remain locked.

It is still a further object of the invention to provide in the drawbar a coupler element for connecting into the eye of the ring on the trailing implement which is novel in its construction and which permits lateral swinging of the trailing implement with a minimum of wear on the coupler element.

Other objects and advantages will become apparent to those skilled in the art as the invention is better understood following a full disclosure in the following description and as shown in the accompanying drawings.

Fig. 1 is a side elevation of a tractor and a portion of a trailing implement. For purposes of clarity a portion of the rear wheel has been removed to more clearly show the hitch device.

Fig. 2 is a rear perspective showing the hitch device with the drawbar in its down position and showing portions of the tractor.

Fig. 3 is a side elevation of the hitch device showing the drawbar in the down position.

Fig. 4 is a similar view to Fig. 3 but showing the drawbar in its intermediate raised position.

Fig. 5 is a view similar to Fgs. 3 and 4 but showing the drawbar in its up or locked position.

Fig. 6 is a sectional view taken along the line 6—6 of Fig. 5.

Fig. 7 is a plan view of the connecting elements on the hitch device drawbar and the implement tongue.

The hitch or draft device which is the subject matter of the present invention may be used either as an attachment or may be mounted integrally with a tractor. For purposes of the present disclosure the hitch device will be shown as an attachment, it being obvious that such attachment may be easily fixed to or built in as an integral part of the tractor. The tractor here shown is of a conventional design having an elongated body 10 mounted at its forward end on front steerable wheels 11 and at its rear on a transverse wheel structure including rear wheels 12, 13 and transverse axle means composed of the axle shafts 14, 15 and axle housings 16, 17. Centrally of the axle housings 16, 17 is a differential housing 18.

A tractor drawbar 20 is affixed to the lower surface of the differential housing 18 in any suitable manner. The drawbar 20 extends forwardly as at 21 and rearwardly as at 22 of the differential housing 18 (see Figs. 3–5) and is characterized by having a transverse cross support 23 at its forward end and a transverse cross support 24 at its rear end. As is conventional, the cross support 23 is composed of upper and lower cross pieces 23a, 23b, respectively.

The tractor also has a hydraulic system, indicated in its entirety by the reference numeral 28, which is similar to those common in present day commercial type tractors. Hoses 29, 30 extend from fittings 31, 32 on the rear portion of the hydraulic unit 28. Other portions of the tractor such as steering mechanism and the engine unit are of standard design and are of no importance as concerns the present invention.

A trailing implement 35 is positioned to the rear of the tractor. The implement 35 for purposes of the present disclosure is shown as a wagon or trailer having a box 36 supported on a suitable bed including a front wheel structure 38. Extending forwardly from the wheel structure 38 is a tongue 39 supported at its forward end by a stand 40 which prevents the forward end from engaging or resting on the ground. Also at the extreme forward end of the tongue is a metal ring 41 having an eye 42 at its center which, as will later be explained, is used as a coupling element for connecting the tongue to a complementary coupling element on the drawbar of the draft device.

The draft device, which is the subject matter of the present invention, is attached or mounted on the tractor drawbar 20 by means of a fore-and-aft extending and elongated rigid structural element 45. The structural element 45 is connected at its rear by means of an integral overlapping lug or flange 46 which fits above the rear cross piece 24 of the drawbar 20 and forms a slot in the element 45 for receiving the cross piece 24. The structural element 45 is composed of a pair of parallel and laterally spaced apart portions 47, 48 which are rigidly held together by lateral plates 49 at the rear, upper and lower plates 50, 51 at the forward end, and the flange 46 intermediate the ends. The plates 50, 51 are provided with suitable apertures for receiving a pin 52 which extends through aligned apertures in the cross support 23 of the tractor drawbar 20. A cotter pin 53 operates to prevent disconnection or loosening of the pin 52. The pin 52 prevents fore-and-aft movement of the structural element 45 relative to the tractor and specifically to the tractor drawbar 20. The structural element 45 is therefore mounted on the tractor by moving the flange portion over the cross support 24 and inserting the pin 52 when the apertures in the cross support 23 and plates 50, 51 are in register. External portions 54, 55 of the flange 46 are bolted to the front cross piece 24 so as to rigidify the structural element 45 against lateral swinging relative to the tractor. It should be noted that the forward edge of the section 49, the rearward edge of the flange 46, and the inner surfaces of sections 47, 48 form an opening 59, the purpose of which will later become clear. In depending relation with the section 49 is a lug 58, the purpose of which will also become clear. Also provided in the section 49 is an aperture 57.

A fore-and-aft extending draft link structure or drawbar 60 is composed of a pair of parallel fore-and-aft extending links 61, 62 which are pivotally mounted at their forward end on a horizontal pivot pin 63 which in turn is supported on the forward end of the structural element 45. The structural element 45 as well as the links 61, 62 have their forward end positioned forwardly of the transverse axle means and have their trailing or rear ends to the rear of the transverse axle means. The drawbar unit 60 is further characterized by having at its forward end a coupling unit 64 composed of a lateral plate 65, which is fixed to the forward end of the draft links 61, 62 and which has fixed thereto three vertical pins 70, 71, 72. The two forward pins are bridged together by means of a connecting bracket 77. Journaled on the pins 70-72, are bushings 73, 74, 75, respectively. As shown specifically in Fig. 7, the bushings 73-75 are disposed so as to permit the ring 41 when coupled to the drawbar unit 60 to be positioned between the rear bushing 75 and the forward bushings 73, 74. The plate 65 is provided with an overhanging section 66 which is positioned above the bushing 75 and which has an upper surface on which the ring 41 may slide to be seated between the pins 72 and 70, 71. The lateral plate 65 has an aperture 76 at its rear end.

A rockable or bell crank member 80 is supported on the structural element 45 by means of a transverse pin 81 which extends through the bell crank 80 and the left and right hand sections 47, 48. The bell crank 80 is characterized by having a pair of radially extending portions or arms 82, 83 each of which are apertured at their outermost ends for receiving respective pivot pins 84, 85. Connecting the rearwardly extending arm 83 to the drawbar 60 is connecting link means 86. The link means 86 is composed of a pair of parallel and laterally spaced apart link members 87, 88 which are rigidly held together by means of a plate 89, which as will later become apparent also serve as a stop, and are so spaced apart so as to permit the arm 83 to pass between them. The links 87, 88 are curved as at 90, and are connected to the drawbar 60 by means of a pivot pin 91 which extends through outwardly projecting bosses, as at 92, on the draft links 61, 62. Cut in the rigid element 45 are notches as at 93, for receiving the bosses 92.

A power unit, here in the form of a hydraulic cylinder 100 is pivotally mounted on the pin 63 and is positioned between the sections 47, 48 of the structural element 45. The hydraulic cylinder 100 has a fore-and-aft operating ram 101 which is pivotally supported at its rear end on the pin 84. A suitable coupling, as at 102 is provided on the rear terminal end of the ram 101 for connection to the pin 84. Fluid is received into the hydraulic cylinder 100 by means of hose fittings 103, 104 which receive the hydraulic hoses 29, 30.

The draft device operates in the following manner. Assuming the trailing vehicle 36 is disconnected from the tractor as shown in Fig. 1, the tractor is first moved rearwardly to cause the draft link or drawbar 60 to move under the ring 41 where the ring will be in a position to be seated in the coupling element 64 at the rear of the drawbar 60. Fluid is then forced into the hydraulic cylinder 100 to cause the ram 101 to extend thus causing the rockable member or bell crank 80 to move in a clockwise direction (as viewed in Figs. 3-5). Clockwise movement of the bell crank 80 will cause the drawbar 60 to move upwardly from its ground-proximate position. The linkage connection will operate in the manner shown in Figs. 3, 4, and 5. That is, the arm 83 and the link means 86 moves upwardly through the opening 59 and upon reaching its uppermost position, as shown in Fig. 5, the arm 83 and the link means will be substantially vertical with the arm 83 being disposed between the links 87, 88. The drawbar 60 will at this point be substantially horizontal. Also, the link means 86 will have reached a position in which a line C—C between the centers of the pivot pins 85, 91 will have passed forwardly of the pin 81. Therefore, there will be provided an over-center lock preventing downward movement of the drawbar 60. The plate or stop 89 will prevent further clockwise swinging of the bell crank 80. Therefore, in effect the drawbar 60 in its uppermost position will automatically be locked to prevent inadvertent dropping or release of the drawbar 60.

Again viewing Fig. 5, when the drawbar 60 reaches its uppermost or operative position the lug 58 will be in position relative to the coupling unit 64 to prevent movement of the ring 41 out of or into disengagement with the coupling unit 64. The ring 41 will normally ride against the bushing 75, although incidental engagement with the bushings 73, 74 will occur, thereby preventing wear directly on the pins 70, 71, and 72. The apertures 57, 76 will be aligned vertically thereby making it possible to place a drop pin through them. This latter feature is for purpose of making it possible to hitch an implement to the drawbar 60 when the hydraulic cylinder is not connected to the hydraulic system 28.

It should be emphasized that while the pick-up and drawbar mechanism has been shown in conjunction with a tongue on the fore end of a trailer, the present hitch device would operate with any type of implement which is overbalanced at its forward end to have its forward end resting on the ground so long as the implement is provided with a ring type coupling as described. A draft device of this type becomes particularly useful in coupling heavier type implements overbalanced at their forward ends and also for coupling to implements such as the two wheel type manure spreader which when loaded becomes extremely difficult to lift manually to a height of a normal type drawbar. It should also be emphasized that by mounting the attachment under the transverse axle means with the forward end of the drawbar forward of the axle, the load on the tractor created by lifting the implement will be proximate to the vertical plane of the axle thereby limiting the effect of the load on the tractor.

While one form of the invention has been shown it should be recognized that other forms and variations could exist without departing basically from the broad general principles herein disclosed. It should therefore be understood that while the preferred embodiment of the invention has been described with the view of clearly and concisely illustrating its principles it is desired not to so limit or narrow the invention beyond that which is claimed.

What is claimed is:

1. A coupling attachment for a tractor having an elongated body and a rear supporting wheel structure including transverse axle means comprising: a rigid elongated structural member adapted for fore-and-aft mounting on the tractor beneath the axle means and with opposite ends thereof positioned front and rear respectively of the transverse axle means; a drawbar pivotally mounted on the front end of the structural member and extending rearwardly, and having a rear portion thereof adapted for swinging between a lower position proximate to the ground and an upper position proximate to the structural member; a hydraulic cylinder mounted on the structural member and having a ram movable fore-and-aft; a rockable member mounted on the structural member; means connecting the rockable member to the ram whereby the former will rock in response to movement of the latter; a radial arm on the rockable member; a link connecting the drawbar to the arm for causing the drawbar to move between its upper and lower positions in response to rocking of the arm, the length and relative positions of the arm and link being such as to create an over-center lock when the drawbar is in its upper position; a coupling element on the rear of the drawbar for engaging a complementary coupling element on the forward end of a trailing vehicle; and locking means on said structural member for preventing disengagement of the coupling elements upon the drawbar being positioned in its upper position.

2. A coupling attachment for a tractor having an elongated body and a rear supporting wheel structure including transverse axle means, comprising: a rigid elongated structural member adapted for fore-and-aft mounting on the tractor beneath the axle means and with opposite ends thereof positioned front and rear respectively of the transverse axle means; a drawbar pivotally mounted on the front end of the structural member and extending rearwardly, and having a rear portion thereof adapted for swinging between a lower position proximate to the ground and an upper position proximate to the structural member; a hydraulic cylinder mounted on the structural member and having a ram movable fore-and-aft; a rockable member mounted on the structural member; means connecting the rockable member to the ram whereby the former will rock in response to movement of the latter; a radial arm on the rockable member; a link connecting the drawbar to the arm for causing the drawbar to move between its upper and lower positions in response to rocking of the arm, the length and relative positions of the arm and link being such as to create an over-center lock when the drawbar is in its upper position.

3. A coupling attachment for a tractor having an elongated body and a rear supporting wheel structure including transverse axle means, comprising: a pair of rigidly connectible fore-and-aft extending elongated structural elements laterally spaced apart and adapted for fore-and-aft mounting on the tractor beneath the axle means with opposite ends thereof positioned front and rear respectively of the transverse axle means; a drawbar unit composed of a pair of laterally spaced drawbar links pivotally mounted for vertical swinging on the front end of the structural members, the rear portions thereof being swingable between a lower position proximate to the ground and an upper position alongside of the structural elements; a rockable member mounted on the structural elements and including a radial portion; a link connecting the drawbar unit to the radial portion; a hydraulic cylinder mounted on and between the structural elements and having a fore-and-aft extending ram; means connecting the ram to the rockable member for causing raising or lowering of the drawbar links in response to operation of the cylinder, the length and relative positions of the radial portion and the link being such as to create an over-center lock when the drawbar is in its upper position; a coupling element on the rear of the drawbar for engagement with a complementary coupling element on a trailing vehicle; and locking means on said structural elements for preventing disengagement of the coupling elements upon the drawbar being positioned in its upper position.

4. The invention defined in claim 3, in which the coupling element on the drawbar includes an upwardly extending portion adapted to be received in an eye of the coupling element on the trailing implement and the locking means on the structural elements includes a rigid integral portion positioned to retain the pin in the eye when the drawbar reaches its upper position.

5. The invention defined in claim 4, in which the upwardly extending portion is characterized by having an annular outer portion journaled to an upright pin for reducing frictional resistance against lateral swinging of the trailing implement relative to the drawbar.

6. A coupling attachment for a tractor having an elongated body and a rear supporting wheel structure including transverse axle means, comprising: a pair of rigidly connected fore-and-aft extending elongated structural elements laterally spaced apart and adapted for fore-and-aft mounting on the tractor beneath the axle means with opposite ends thereof positioned front and rear respectively of the transverse axle means; a drawbar unit composed of a pair of laterally spaced drawbar links pivotally mounted for vertical swinging on the front end of the structural members, the rear portions thereof being swingable between a lower position proximate to the ground and an upper position alongside of the structural elements; a rockable member mounted on the structural elements and including a radial portion; a link connecting the drawbar to the radial portion; a hydraulic cylinder mounted on and between the structural elements and having a fore-and-aft extending ram; means connecting the ram to the rockable member for causing raising or lowering of the drawbar links in response to operation of the cylinder, the length and relative positions of the radial portion and the link being such as to create an over-center lock when the drawbar is in its upper position.

References Cited in the file of this patent

UNITED STATES PATENTS

| 1,939,950 | Brown | Dec. 19, 1933 |
| 2,779,260 | Orelind et al. | Jan. 29, 1957 |
| 2,791,444 | McNeice | May 7, 1957 |
| 2,803,358 | Elfes | Aug. 20, 1957 |

FOREIGN PATENTS

| 665,904 | Great Britain | Jan. 31, 1952 |